Dec. 18, 1962  J. B. FULK  3,069,155
METHOD AND APPARATUS FOR MAKING PRINTED FORMS
Filed June 16, 1960
7 Sheets-Sheet 1

INVENTOR.
JAMES B. FULK
BY
Teare & Felzer
ATTORNEYS

Dec. 18, 1962 J. B. FULK 3,069,155
METHOD AND APPARATUS FOR MAKING PRINTED FORMS
Filed June 16, 1960 7 Sheets-Sheet 2

INVENTOR.
JAMES B. FULK
BY
Teare & Felzer
ATTORNEYS

Dec. 18, 1962 J. B. FULK 3,069,155
METHOD AND APPARATUS FOR MAKING PRINTED FORMS
Filed June 16, 1960 7 Sheets-Sheet 3

Fig. 4

INVENTOR.
JAMES B. FULK
BY
Teare & Felzer
ATTORNEYS

Dec. 18, 1962   J. B. FULK   3,069,155
METHOD AND APPARATUS FOR MAKING PRINTED FORMS
Filed June 16, 1960   7 Sheets-Sheet 4

INVENTOR.
JAMES B. FULK
BY
Teare & Fetzer
ATTORNEYS

Dec. 18, 1962    J. B. FULK    3,069,155
METHOD AND APPARATUS FOR MAKING PRINTED FORMS
Filed June 16, 1960    7 Sheets-Sheet 5

INVENTOR.
JAMES B. FULK
BY
Teare & Fetzer
ATTORNEYS

Dec. 18, 1962  J. B. FULK  3,069,155
METHOD AND APPARATUS FOR MAKING PRINTED FORMS
Filed June 16, 1960  7 Sheets-Sheet 6

INVENTOR.
JAMES B. FULK
BY
Teare & Felzer
ATTORNEYS

Dec. 18, 1962 J. B. FULK 3,069,155
METHOD AND APPARATUS FOR MAKING PRINTED FORMS
Filed June 16, 1960 7 Sheets-Sheet 7

INVENTOR.
JAMES B. FULK
BY
Teare + Fetzer
ATTORNEYS

United States Patent Office 3,069,155
Patented Dec. 18, 1962

3,069,155
METHOD AND APPARATUS FOR MAKING PRINTED FORMS
James B. Fulk, 18309 Lexington Drive, Los Gatos, Calif.
Filed June 16, 1960, Ser. No. 36,606
22 Claims. (Cl. 270—18)

This invention relates to a method and apparatus for feeding one or more webs of paper through a rotary printing press, and to a method and apparatus for controlling the movement of the webs through the press.

One of the difficulties in the manufacture of long continuous webs of business forms has been the attainment of exact predetermined "lengths" and of maintaining such lengths in high speed production. This problem is particularly acute in the manufacture of tabulating forms which have rows of holes extending along the side edges of the webs for controlling the movement of the forms through a tabulating machine. In some instances the rows of holes are punched in single webs and the webs are then collated to make an assembly of multiple forms. At such time any variation in the "length" of the webs interferes with the proper alignment of the holes during the collating operation and, therefore, interferes with the direct registration of the webs in the final assembly. The term "length" as used herein has reference to trade usage wherein the hole spacing, for example, on one inch centers should not vary more than 1/64 of an inch in a length of at least 6 feet of web.

Various factors in the course of manufacture of a web and in the storage of the rolls of pre-punched webs effect the "length" of the web. Thus, variations in humidity, or in quality of the paper affect the stretch of the paper, while storage of pre-punched rolls has the same effect, particularly where many months may elapse between the time of punching the holes and the time of assembling the webs into the multiple forms.

A further problem which has been encountered in the manufacture of tabulating forms has been the maintenance of exact "length" where multiple webs are simultaneously processed through a press. This is especially noticeable where "crash" or transfer printing has been attempted in connection with the use of carbonless or chemically treated webs, such as Hectograph paper. The term "crash" printing as used herein refers to the act of printing, wherein the webs are subjected to great pressure while positioned between a hard printing plate and a hard impression plate. Due to the high degree of pressure required for "crash" printing, and due to the difficulty of obtaining a uniform degree of pressure with printing plates having different degrees of impression area, the practice has developed of performing the "crash" printing operation with flat plates while the webs are held in stationary position. This means that the webs must be moved with an intermittent motion through the press, thereby resulting in about one-fifth the production of that which could be obtained if the webs could be "crash" printed on a rotary press at the normal speed of the press.

The high degree of pressure required for "crash" printing presents a further problem when an attempt is made to perform the operation with a rotating cylindrical printing couple, in that the rolls exert a "squeegee" action upon the webs which causes the paper to wrinkle and tear. The problem is greatly augmented as the number of webs is increased, because any shifting movement of a web with relation to the other webs causes the paper to bunch up immediately in front of the cylinders and to prevent the normal movement of the webs through the press.

A further difficulty which has been experienced in the operation of a press, particularly when operating on multiple webs, has been the fact that a great deal of waste occurs and that production time is lost whenever a press is stopped and is allowed to stand in idle condition for an appreciable length of time, such as overnight before resuming operation. Such waste is frequently in excess of 10% of the material which is processed through the press.

One of the objects of the present invention is the provision of a method and apparatus which will enable single webs to be made in exact "length" on rotary press and then rewound on rolls and stored for any length of time for subsequent use in a rotary press, without incurring the danger of objectionable variation in the "length" from changes in humidity, stretching of the paper or from any other known cause.

The invention includes a method and apparatus by means of which rows of holes may be punched along the edges of a web of tabulating forms after which the web is rewound upon a roll, or cross-perforated and flat packed in continuous strips, and then is subsequently run through a collating machine, in multiple with other pre-punched webs, without any misalignment of the holes regardless of the length of time of storage of the rolls. In this connection the invention contemplates the accomplishment of the foregoing without the necessity for making adjustments to the press during the punching operation, for the purpose of maintaining exact "length" of punched webs. This reduces the number of persons required for operation of a press and enables the press to be stopped and started at will, without objectionable waste of paper and without any variation in the "length" due to any possible slackening of the webs resulting from a stoppage of the press.

A further object of the invention is the provision of a method and apparatus by means of which tabulating forms may be made in multiple and in long continuous lengths, without necessitating the pre-punching of each web singly and then subsequently collating it with other pre-punched webs; and by means of which "crash" printing may be performed on the multiple webs while passing through a rotary press in a continuous motion and at the normal speed at which the press is designed to operate. The invention contemplates the accomplishment of such procedure in any desired number of webs and the performance thereon of the usual printing, perforating or other operations, as are normally required for the manufacture of tabulating forms in long continuous webs. Moreover, the invention includes a method and apparatus by means of which the foregoing "crash" printing operation may be performed while maintaining exact "lengths" of punched webs without the necessity for manual adjustment and constant attention thereto while the press is in operation.

Referring to the drawings.

FIG. 3 is a vertical section taken on a plane indicated by the line 3—3 in FIG. 1, but on a scale larger than that of FIG. 1;

FIG. 8 is a side view of a portion of the web guiding structure on a scale larger than that of FIG. 3;

Figure 1:
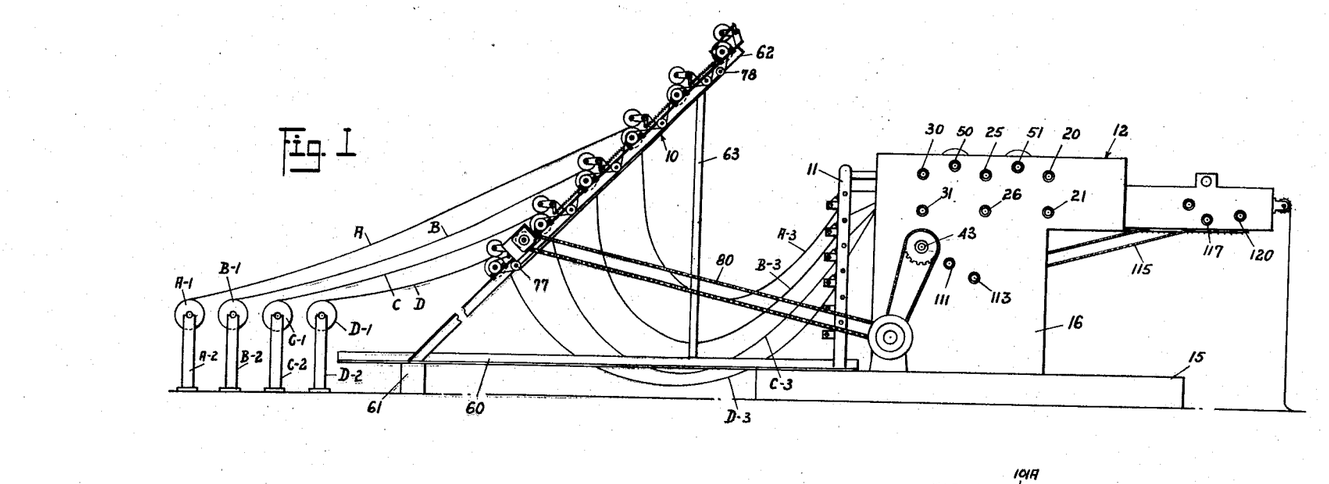
FIG. 1 is a side elevation of a press and feeding and guiding equipment which embodies the present invention.

The present invention is intended for use on one or more webs of paper but, in FIG. 1, for example, I have shown 4 webs indicated at A, B, C and D, as being withdrawn from rolls A1, B1, C1 and D1, respectively which may be supported on suitable standards A2, B2, C2 and D2, respectively. The webs are passed through a withdrawing apparatus, indicated in general at 10, and from thence they fall in festoons as indicated at A3, B3, C3 and D3 respectively, from whence they pass into a guiding apparatus indicated in general at 11, and then into a press which is indicated in general at 12.

The present invention is concerned with a method of controlling the movement of one or more webs continuously through a press while holding the web or webs in exact lengths and of feeding the web or webs continuously through the press at a high rate of speed. Additionally, the invention contemplates a method of controlling and moving the webs through a press so that "crash" printing can be accomplished with a rotary printing couple, while the webs are moving with a continuous motion and at a high rate of speed through the press.

The press shown in the drawings is merely illustrative of one form which is capable of carrying out the present invention. As shown, it has a frame which includes a base 15 and side plates 16 and 17, which extend parallel to each other and are rigidly fastened to the base. The frame supports a rotary printing mechanism together with apparatus for forming one or more rows of holes in the paper and for propelling the paper and holding it in proper position for work operations such as printing and perforating to be performed thereon.

For the purpose of illustration, in FIGS. 1 to 5, I have shown shafts 20 and 21 which support the plate cylinder 22 and impression cylinder 23 respectively of a printing couple. Additionally, for purposes of illustration, I have shown another pair of shafts 25 and 26 which may support a perforating roll 27 and a back-up roll 28. If desired, the plate and impression cylinders can be mounted on the shafts 25 and 26 in which case the perforating and back-up rolls 27 and 28 would be mounted on the shafts 20 and 21 respectively.

Figure 2:
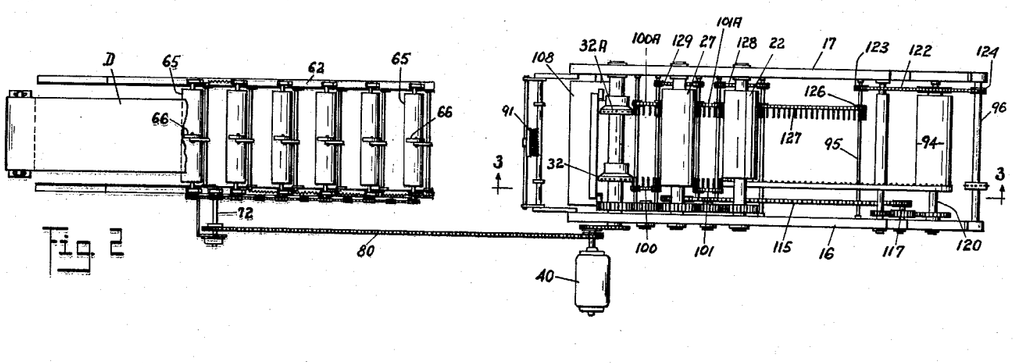
FIG. 2 is a top plan view of the apparatus shown in FIG. 1, but with only one roll of paper being shown.

The present invention contemplates the controlling and feeding of the paper through the press by means of traveling pins which engage a row of holes in the paper. Accordingly, I have shown additional shafts 30 and 31 which are journalled in the frame and which carry a roll 32 having uniformly spaced punches 33 therein and a roll 34 having coacting openings 35 respectively. It is understood that the openings 35 are in registration with the punches 33 so as to form a row of holes in the paper as it passes through the press. The roll 32 may be referred to as the punch and the roll 34 may be referred to as the die. In FIG. 2 I have shown the punch 32 for punching one row of holes along one edge of a web of paper, and an additional punch 32A, also affixed to the shaft 30, for punching a second row of holes along the opposite edge of the paper web. It is to be understood that there is a die roll also affixed to the shaft 31 which is similar to the die roll 34 and which coacts with the punch 32A.

To rotate the various shafts for the punching perforating and printing operations, I have shown an electric motor 40 which is connected in any suitable manner to the apparatus for propelling the webs through the press and for performing work operations thereon.

Figure 4:
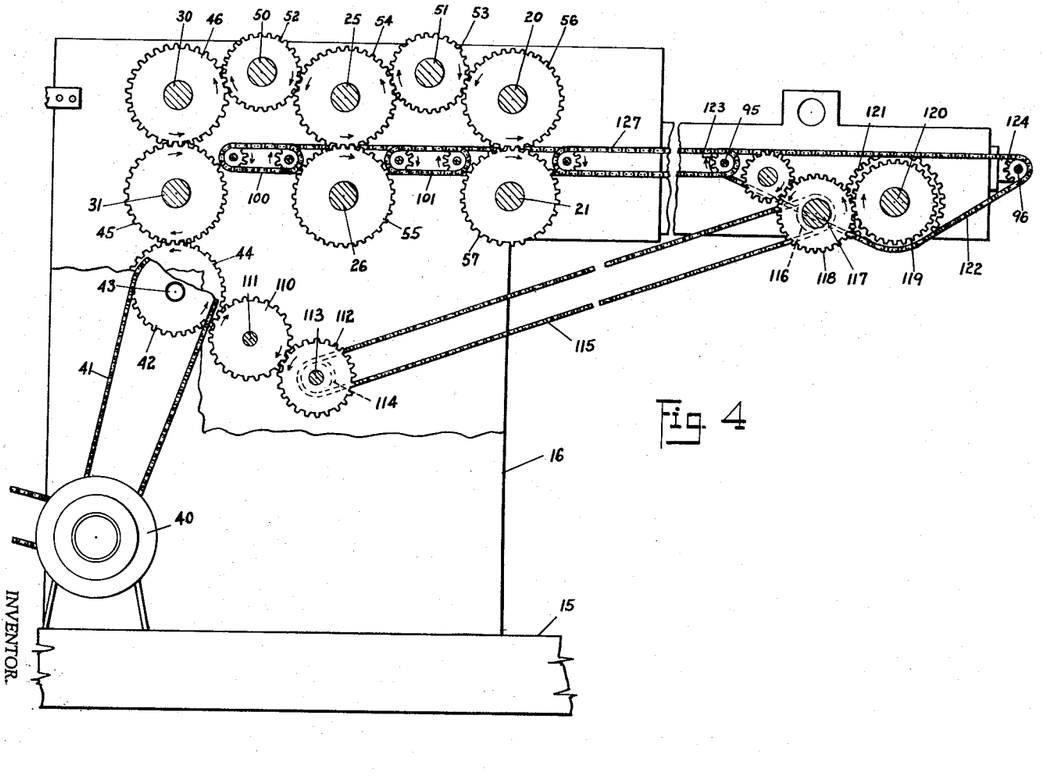
FIG. 4 is a side view of a press partly in section and showing the driving arrangement.

Thus, in FIG. 4 the motor is shown as being connected by a chain 41 to a sprocket wheel 42 which is fixed to a shaft 43, the latter of which is journalled in the frame. The shaft 43 has fixed thereto a gear 44 which is adapted to mesh with a gear 45 on the shaft 31. A gear 46 which is fixed to the shaft 30 meshes with the gear 45. Such gears have a one-to-one ratio, wherefore, the punch and die rotate in unison and remain in registration.

To operate the printing and perforating rolls, I have shown shafts 50 and 51 which are journalled in the frame and which carry gears 52 and 53 respectively. The gear 52 meshes with a gear 54 fixed to the shaft 25 and the gear 54, in turn, meshes with gears 55 and 53 on the shafts 26 and 51 respectively. Additionally, the gear 53 meshes with gear 56 which is fixed to the shaft 20 and the latter gear meshes with the shaft 57 which is fixed to the shaft 21. In practice, the gear couple 54 and 55, as well as the couple 56, 57 have a one-to-one ratio. As shown, the shafts for the punching, printing and perforating couples are journalled in the press frame.

To draw the webs from the rolls, I have shown a frame which, in the form illustrated, has a base 60, comprising bars which are fixed to the base 15 and to a pedestal 61. The bars are shown as supporting a frame 62 which extends diagonally upwardly from the base 60 and is supported by a brace 63.

Figures 2, 6, 9:
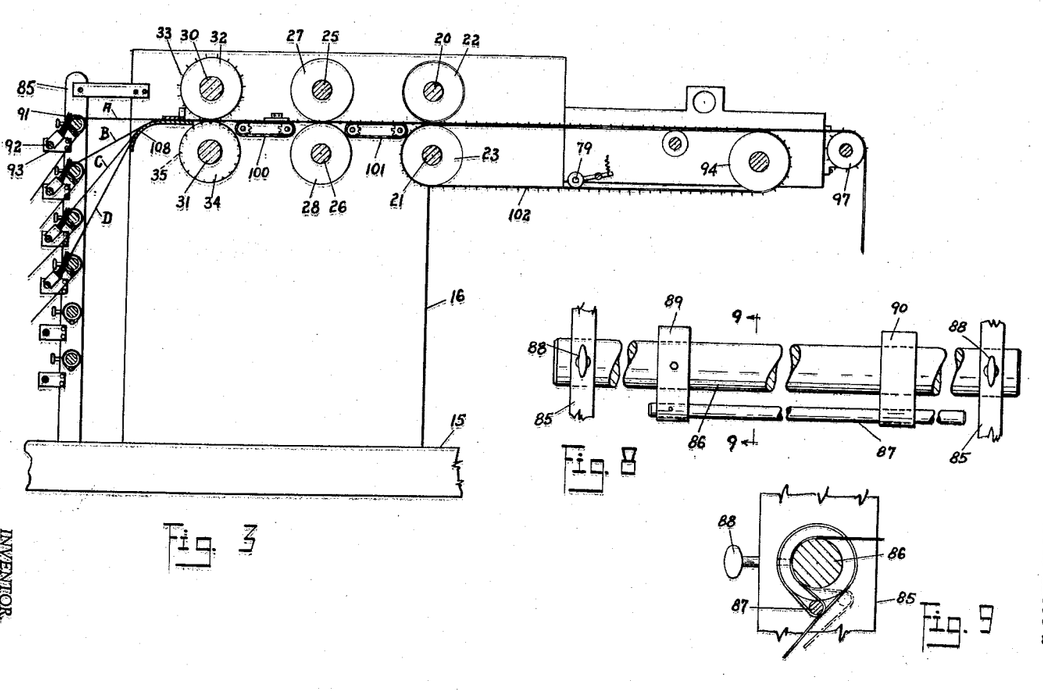
FIG. 6 is a side view of a portion of the apparatus for withdrawing the webs from the rolls.
FIG. 9 is a vertical section taken on a plane indicated by the line 9—9 in FIG. 8.
Figure 7:
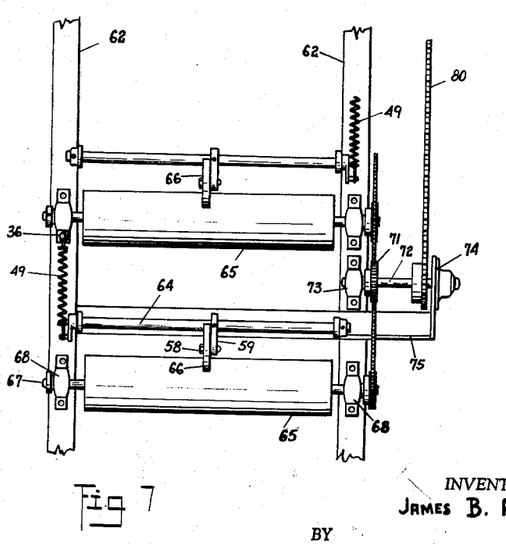
FIG. 7 is a top plan view of a portion of the withdrawing apparatus as indicated by the line 7—7 in FIG. 6.

The frame 62, as shown, may comprise parallel angle bars which support rolls 65 equal in number to the webs in use. A co-acting roll 66 presses against each roll 65 and forms a bight between which a web of the paper extends. Each couple is substantially the same as the others and each is intended to be positively rotated in synchronization with the gearing which operates the punching, printing and perforating rolls. Thus, for example, as shown in FIGS. 6 and 7, each withdrawing couple has the lower roll 65 mounted upon a shaft 67, and the upper roll 66 journalled at 58 in an arm 59. The arm in turn may be fixed to a rod 64 which is supported by and oscillatable within brackets 47 on the frame 62. Another arm 48, also fixed to the rod 64, is attached to one end of a spring 49, the other end of which is attached, as at 36, to the frame 62. Thus, the spring operates to maintain a yieldable pressure against the paper sufficient to withdraw it from the roll.

Each shaft 67 may be journalled in bearing blocks 68 which are fastened to the frame 62, and each shaft 67 may have fixed thereto a sprocket wheel 69 which is driven by a chain 70. The latter is shown (FIGS. 6 and 7) as being driven by a sprocket wheel 71, which is fixed to a shaft 72, the latter of which may be journalled at one end in a bracket 73 on the frame 62, and at the other end in an outboard bearing 74. The bearing is carried on a bracket 75, which is fixed to the frame 62. It is to be understood that the chain 70 passes around a sprocket wheel, similar to 69 on each roll shaft 67 as indicated by the common reference characters in FIG. 6. The lower reach 76 of the chain 70 may be guided by suitable sprocket wheels 77 and 78 at opposite ends of the frame 62.

To drive the withdrawing rolls 65, I have shown a chain 80 which is in mesh with a sprocket wheel 81 fixed to the shaft 72. The chain may be rotated by the motor 40. It follows that the chain 70 is operated in synchronism with the mechanism for punching, printing and perforating the paper.

It is the intention of utilizing the withdrawing apparatus for pulling the webs off the rolls, but to allow a free fall or loop between the withdrawing apparatus and the press, as is shown in FIG. 1. To guide the webs, however, into the press, I have shown a mechanism which places a slight tension upon the paper as it moves into the press. Thus, the apparatus shown includes a frame in the form of spaced bars 85 which are fastened to the base 15 in any suitable way and to the plates 16 and 17, respectively. The frame supports a series of couples which are in the form of bars as shown particularly in FIGS. 3, 8 and 9. Thus, there is an upper bar 86 and a lower bar 87 in each couple, the first of which is connected to the frame as by wing bolts 88. Each bar 86 carries collars 89 and 90 which, in turn, support the bar 87. The collars 89 and 90 may be adjusted angularly with respect to the bar 86 for varying the position of the bar 87 angularly with respect to the bar 86. Thus, each web of paper passes upwardly around a bar 87, thence, around the coacting bar 86 and into the press. The annular position of the bar 87 with respect to the bar 86 determines the amount of wrap-around of the paper for achieving the desired degree of resistance sufficient to keep the paper flat as it moves into the press. If desired, a brush 91 may be fixed to a bar 92 the latter of which is adjustably mounted within brackets 93 on the frame. This operates to smooth out any wrinkles in the paper during its movement into the press. Additionally, I may utilize the weight of a flat bar 98 which rests freely upon the paper, in advance of the punch, and which operates to smooth out any slight wrinkle in the paper. The bar is moved by the paper into engagement with abutments 99 and 99A and is held thereagainst while supported upon a pan 108, which is fixed to the frame.

Figure 5:
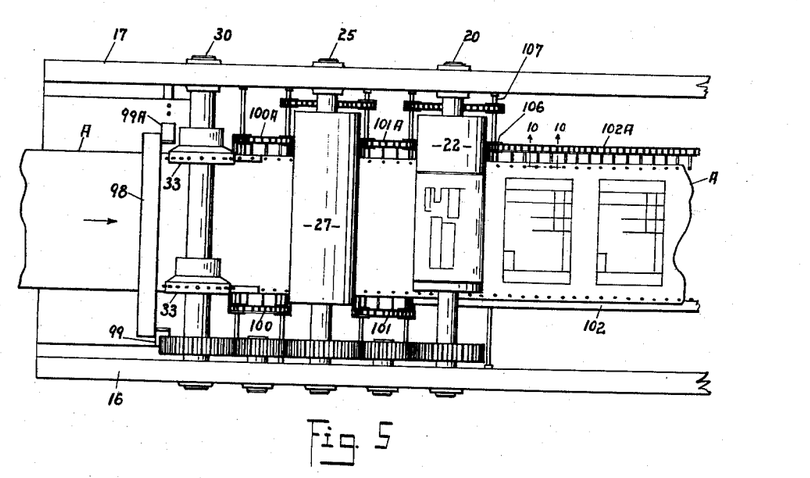
FIG. 5 is a top plan view of a portion of the press, but on a scale larger than that of FIG. 2.
Figure 6:
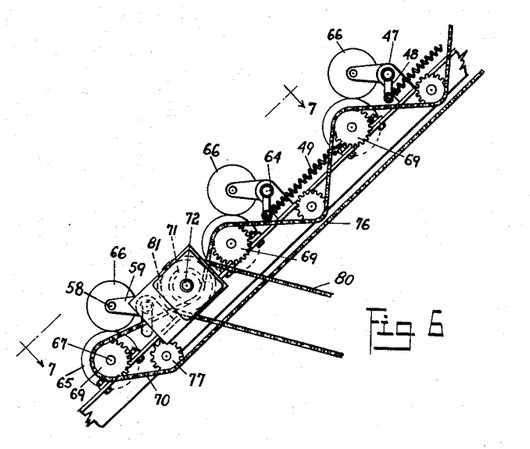
Figure 10:
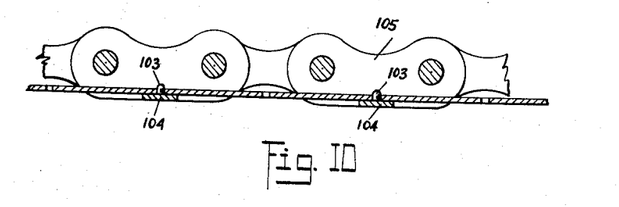
FIG. 10 is a section taken on a plane indicated by the line 10—10 in FIG. 5, but on a scale larger than that of FIG. 5.
Figure 11:
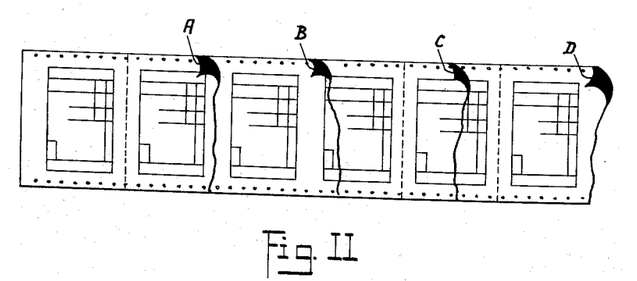
FIG. 11 is a top plan view of the webs removed from the press.

To control the movement of the paper through the press, and to hold it in the desired degree of tautness for performing work operations thereon, I provide means for engaging the holes in the paper as soon as possible after it has passed through the punching operation. Thus, in the embodiment of FIGS. 1 to 5 where the roll 27 is longer than the width of the web, and where two rolls of holes are punched in the paper, I have shown endless belts 100 and 100A positioned between the punching rolls and the roll 27 and I have shown a similar set of endless belts 101 and 101A, between the roll 27 and the roll 22. In this embodiment the roll 22 is shorter than the roll 27. Additionally, I have shown endless belts 102 and 102A which operate to transfer the paper after it has passed through the printing couple (FIG. 5). Each of said belts carries pins as is shown, for example, at 103 in FIG. 10, which extend upwardly from arms 104, the latter of which are carried by the links 105 of the associated belt and extend inwardly therefrom toward the web.

Due to the fact that the frame roll 22 is shorter than the width of the web, the belt 102 may extend at one end around the roll 23, as is best shown in FIG. 3, and around a roll 94 at the other end, the latter roll being driven by the motor 40 as will be hereinafter described. Tension on the belt 102 may be maintained by a spring loaded idler roll 79. The belt 102A, however, extends around a sprocket wheel 106 which is fixed to a shaft 107 on the delivery side of the printing couple.

To operate the respective pin belts in unison, and in timed relationship to the punching and other work-performing operations, I have shown in FIG. 4 an arrangement for driving them by the motor 40. This may comprise a gear 110 mounted on the shaft 111 and meshing with the gear 44, the shaft 111 being journalled in the frame. The gear 110 meshes with a gear 112 which is fixed to a shaft 113, the latter of which is journalled in the press frame. A sprocket wheel 114 fixed to the shaft 113 drives a chain 115 which, in turn, drives a sprocket wheel 116 fixed to a shaft 117, the latter of which is journalled in the press frame. The shaft 117 has a gear 118 fixed thereto which meshes with a gear 119 mounted on a shaft 120, the latter of which is journalled in the press frame. Another gear 121 fixed to the shaft 119 drives a chain 122 which passes around sprocket wheels 123 and 124 on shafts 95 and 96, journalled in the frame. The shaft 125 carries a sprocket wheel 126, which drives a chain 127 and this, in turn, drives the belts 101A and 100A by chain belts 128 and 129 respectively. Thus, all of the pinned belts are synchronized for movement with the rotation of the work-performing operations in the press. Control of the paper during its movement through the press is maintained by engaging the holes therein with a pinned wheel 97 which is fixed to the shaft 96, as is shown in FIG. 3. Since the shaft 96 is driven by the chain 122, it is rotated in synchronization with the pinned belts and the work-performing members.

By engaging the webs as soon as they have passed through the punching operation, and by holding them until they engage the next set of rolls in the press and thereafter immediately engaging them again after they have passed through the second set of rolls, and by repeating the engagement after each set of rolls has been passed enables the webs to be pulled through the press without any possibility of deviation, and enables the "lengths" of the webs to be accurately controlled even though the press is operating at maximum speed.

I have found that by pulling a web into a press from a free-falling loop or festoon, by means of the pinned belts, that I can perform work such as "crash" printing on one or more webs with a degree of accuracy hitherto unobtainable while moving the web with a continuous motion. The pinned belts, by engaging the holes in the paper immediately after they have been punched therein, operate to feed the paper through the press and to control its movement at all times. The control is sufficiently accurate that "crash" printing can be performed on the paper while the paper is moving continuously through the press and at a high rate of speed. This is accomplished without any wrinkling occurring in the paper immediately in front of the printing rolls, as would normally be the case if the controlling method of this invention were not employed. The wrinkling would normally be the result of the high degree of pressure which is required between the printing and impression rolls during a "crash" printing operating.

Figure 12:
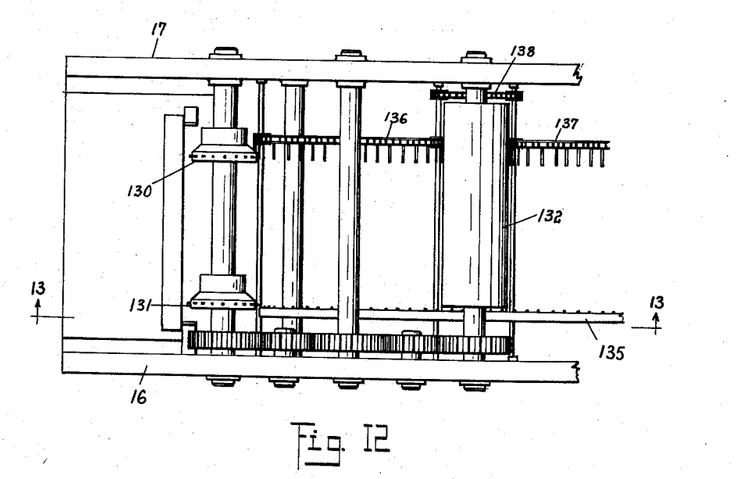
FIG. 12 is a top plan view of a modification of the invention.
Figure 13:
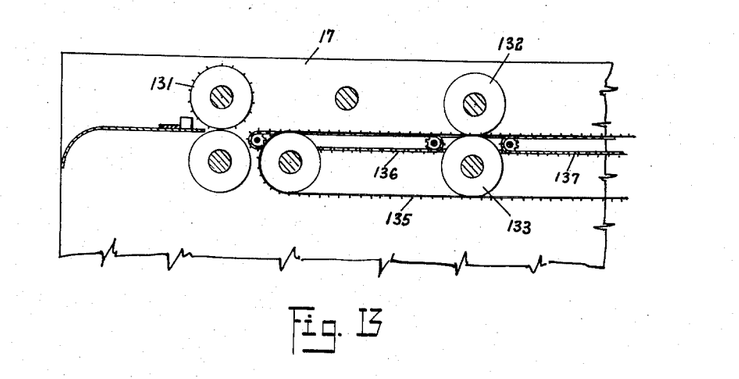
FIG. 13 is a vertical section taken on the plane indicated by the line 13—13 in FIG. 12.

In FIG. 12, I have shown a modification of the invention wherein two rows of holes are punched as indicated by the punches 130 and 131 respectively, but wherein only cylinder 132, which constitutes a printing cylinder, and an impression cylinder 133 are used. In this case, due to the fact that the cylinder 132 is shorter than the web of the paper, a pinned belt 135 may extend back to the point immediately adjacent the discharge of the paper from the punching operation. On the side of the web opposite the belt 135, I have shown a short pinned belt 136 which extends from the punching roll to the printing roll, and another pinned belt 137 which again picks up the web after it has passed through the printing operation. In this case, the pinned belt 137 may be driven in the manner as the pinned belt 102A, and may be drivingly connected to the pinned belt 136 by a sprocket chain 138.

Figure 14:
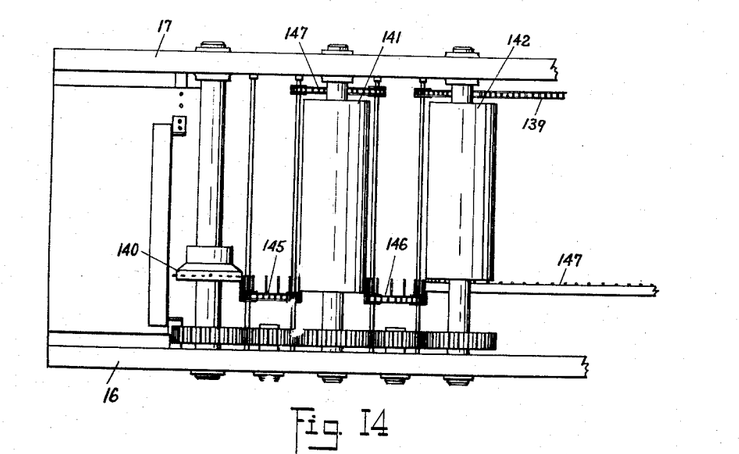
FIG. 14 is a top plan view of another modification of the invention.

In FIG. 14, I have shown a modification wherein a single roll of holes is punched along the web, in which case a single punching couple indicated at 140, is used. In this instance, I have shown work-performing cylinders 141 and 142, wherein the cylinder 142 is shorter than the width of the web. In this case, therefore, I employ a short endless pinned belt 145 between the punching couple and the roll 141, and another short-pinned belt 146 between the cylinders 141 and 142. A pinned belt 147 then operates to engage the web after it has passed through the couple indicated by the cylinder 142. The belt 146 may be driven by a chain 139 while the belt 145 may be driven by a chain 147. The chain 139 may be operated by suitable positive driving connections from the motor 40 as previously described for the apparatus of FIGS. 1 to 5.

Figure 15:
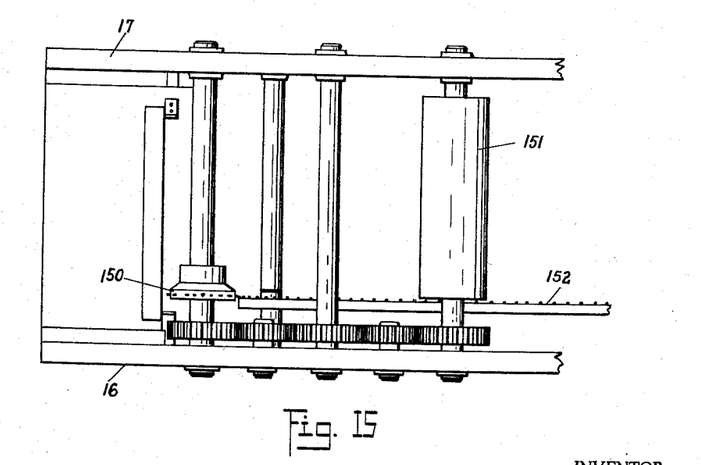
FIG. 15 is a top plan view of a further modification of the invention.

In the modification of FIG. 15, a single row of holes may be punched by a punching couple indicated at 150 and a single printing couple, indicated at 151, wherein the printing cylinder is shorter than the width of the web. In this case, the endless pinned belt 152 may extend back as far as the punching operation and may pick up the web at that point and hold it continuously as it is pulled through the press.

It is apparent from the foregoing, that the present invention is suitable for use either with one or more webs of paper, for controlling and feeding it through the press in exact lengths, and that it is also suitable for enabling "crash" printing to be performed upon the paper. The invention may be accomplished with the use of one or more rows of holes in the paper, as is illustrated in the various embodiments. By feeding the paper into the press from a free-falling loop, or festoon, the mechanism within the press is utilized for pulling the paper into the press and for holding it under positive control until it is discharged from the press. In this way, I have solved the problem of variations in "lengths" of printed webs, and I have devised a method which enables "crash" printing to be performed while the paper is moving continuously and at a high rate of speed through the press.

I claim:

1. A method of making a web of paper having a continuous row of openings spaced at exact predetermined intervals, comprising forming a festoon in the web, simultaneously punching and pulling the web to form the holes progressively end to end while it is in motion, holding the web in taut condition during the hole forming operation by exerting pressure against the walls of some of the previously formed holes while maintaining the web in flat coplanar condition, so as to exert a pulling operation upon the web and by applying a frictional pressure to the web in advance of the punching operation.

2. A method according to claim 1, wherein the pulling is accomplished by applying a pulling pressure against the walls of a plurality of holes in adjacent openings.

3. A method of printing indicia upon a web of paper having a continuous row of openings spaced at exact predetermined intervals, comprising forming the holes progressively in a row while the web is in motion, holding the web in taut condition during the hole forming operation by exerting pressure against the walls of some of the previously formed holes so as to exert a pulling operation upon the web, releasing contact with the holes, printing the indicia while the paper is in continuous motion, and again engaging the walls of the holes immediately after the printing operation utilizing such contact for pulling the web and maintaining such contact for a predetermined distance after the printing operation.

4. A method according to claim 3, wherein the hole forming and printing operations are performed simultaneously on a plurality of webs.

5. A method according to claim 4, wherein the printing constitutes "crash" printing.

6. A method of transferring indicia from one face of a web of paper to the face of another web, comprising pulling the webs from rolls, forming festoons in the webs, guiding the webs from the festoons into a printing press, punching a row of holes in the webs near the point of entry into the press, engaging the webs through the holes therein along a straight path immediately after the punching operation, maintaining such engagement until the webs reach a printing station, crash printing the indicia from one web to another while the webs are continuously in motion, and again engaging the webs through the holes therein along a straight path and maintaining a pulling action thereon until the webs are discharged from the press.

7. A method according to claim 6, wherein engaging contact is maintained with the webs, at least along one row of holes, while the webs are passing through the printing operation.

8. Apparatus for feeding a web of paper through a printing press, comprising in combination, means for making a festoon in a web of paper, rotary means for punching a row of holes in the web of paper, rotary means for printing a form on the web, an endless belt having pins projecting therefrom and engaging the holes in the web for moving the web through the press, and power means for actuating said means and belts in timed relationship.

9. Apparatus according to claim 8, wherein the web is engaged by pinned belts positioned between the punching means and the printing means.

10. Apparatus according to claim 8, wherein the web is engaged by pinned belts immediately after the web has passed through the printing means.

11. Apparatus according to claim 9, wherein the web is also engaged by pinned belts after it has passed through the printing means.

12. Apparatus according to claim 8, wherein pulling means operates to withdraw a web from a roll of paper in timed relationship to the punching and printing means.

13. Apparatus according to claim 12, wherein guiding means are provided for maintaining a festoon in the web between the pulling means and the press.

14. Apparatus according to claim 8, wherein a plurality of webs are moved simultaneously through the press in superimposed relationship, and wherein the pins on the belt extend through registering holes in the webs.

15. Apparatus according to claim 14, wherein the printing means exerts sufficient pressure against the webs to crash print indicia from the face of one web to the face of another web.

16. Apparatus according to claim 15, wherein one pinned belt engages the holes in the webs between the punching means and the printing means and wherein another pinned belt engages the holes in the webs after the webs have passed through the printing means.

17. Apparatus according to claim 8, wherein the punching means operates to form two rows of holes in the web, one row being parallel to and adjacent one longitudinal edge of the web, and the other row being parallel to and adjacent the other longitudinal edge of the web.

18. Apparatus according to claim 15, wherein the punching means operates to form two rows of holes in the web, one row being parallel to and adjacent one longitudinal edge of the web, and the other row being parallel to and adjacent the other longitudinal edge of the web.

19. A method of printing indicia upon a web of paper in a rotary press comprising, forming a festoon in the web, applying frictional pressure to the web at one end of the festoon, punching a row of holes in the web, printing indicia on the web at a point separate from the punching operation, and exerting pressure against the walls of some of the holes to pull the web and impart a continuous motion thereto and hold it in taut condition during the punching and printing operations.

20. A method of forming a row of equally spaced holes along a web of paper, comprising, forming a festoon in a moving web, applying frictional pressure to the web adjacent one end of the festoon, punching a row of holes in the web while it is moving with a continuous motion and after the web has passed the point of application of frictional pressure, and pulling the web with a continuous motion along an extended straight portion thereof and during the punching operation by exerting pressure against the walls of the holes which have been formed in the punching operation.

21. A method according to claim 1 wherein at least two webs of paper are passed through a rotary press simultaneously in superposed relationship and are crash printed therein.

22. A method according to claim 21 wherein a row of holes is punched adjacent one edge of the web, and another row of holes is punched in adjacent the other edge of the web.

References Cited in the file of this patent

UNITED STATES PATENTS

| | | |
|---|---|---|
| 1,331,579 | Rosenfeld | Feb. 24, 1920 |
| 2,100,776 | Fulk | Nov. 30, 1937 |
| 2,150,016 | Wood | Mar. 7, 1939 |
| 2,177,675 | Sherman | Oct. 31, 1939 |
| 2,340,819 | Mills | Feb. 1, 1944 |
| 2,773,688 | Fulk | Dec. 11, 1956 |